United States Patent
Liu

(10) Patent No.: US 12,520,163 B2
(45) Date of Patent: Jan. 6, 2026

(54) METHOD FOR ALLOCATING FREQUENCY RESOURCE, APPARATUS, AND COMPUTER-READABLE STORAGE MEDIUM

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 548 days.

(21) Appl. No.: 18/000,091

(22) PCT Filed: May 29, 2020

(86) PCT No.: PCT/CN2020/093446
§ 371 (c)(1),
(2) Date: Nov. 28, 2022

(87) PCT Pub. No.: WO2021/237710
PCT Pub. Date: Dec. 2, 2021

(65) Prior Publication Data
US 2023/0199509 A1    Jun. 22, 2023

(51) Int. Cl.
H04W 16/14    (2009.01)
H04W 76/10    (2018.01)
H04W 76/30    (2018.01)

(52) U.S. Cl.
CPC .......... *H04W 16/14* (2013.01); *H04W 76/10* (2018.02); *H04W 76/30* (2018.02)

(58) Field of Classification Search
None
See application file for complete search history.

(56) References Cited

U.S. PATENT DOCUMENTS

| 6,732,163 | B1 | 5/2004 | Halasz | |
| 2009/0238251 | A1 | 9/2009 | Rofougaran | |
| 2009/0296641 | A1* | 12/2009 | Bienas | H04W 24/02 370/329 |
| 2011/0299479 | A1* | 12/2011 | Deb | H04W 28/18 370/329 |

(Continued)

FOREIGN PATENT DOCUMENTS

| CN | 1901398 A | 1/2007 |
| CN | 104053235 A | 9/2014 |

(Continued)

OTHER PUBLICATIONS

"Global 5G: Implications of a Transformational Technology," 5G Americas Website, Available Online at https://www.5gamericas.org/wp-content/uploads/2019/09/2019-5G-Americas-Rysavy-Implications-of-a-Transformational-Technology-White-Paper.pdf, Sep. 2019, 254 pages.

*Primary Examiner* — Jamaal Henson
(74) *Attorney, Agent, or Firm* — McCoy Russell LLP

(57) ABSTRACT

A communication method includes: obtaining first frequency usage record information, where the first frequency usage record information is used to indicate frequency occupancy in an available frequency band, and the available frequency band and a terahertz frequency band at least partially overlap; and determining an operating frequency of a first access point device according to the first frequency usage record information.

18 Claims, 6 Drawing Sheets

(56) References Cited

U.S. PATENT DOCUMENTS

| | | | | |
|---|---|---|---|---|
| 2014/0328190 | A1* | 11/2014 | Lord .................... | H04W 24/08 |
| | | | | 370/252 |
| 2015/0350949 | A1* | 12/2015 | Wang ................. | H04W 72/541 |
| | | | | 370/230 |
| 2017/0026845 | A1* | 1/2017 | Garg .................... | H04W 16/10 |
| 2020/0296595 | A1* | 9/2020 | Ma ...................... | H04B 17/336 |
| 2021/0389474 | A1* | 12/2021 | Hamzeh ............... | H04B 7/1853 |

FOREIGN PATENT DOCUMENTS

| | | | |
|---|---|---|---|
| CN | 104684026 | A | 6/2015 |
| CN | 104684090 | A | 6/2015 |
| CN | 106211098 | A | 12/2016 |
| CN | 107277917 | A | 10/2017 |
| CN | 108199750 | A | 6/2018 |
| CN | 109640330 | A | 4/2019 |
| CN | 110602792 | A | 12/2019 |
| JP | 2004096148 | A | 3/2004 |
| JP | 2018056616 | A | 4/2018 |
| WO | 2012140311 | A1 | 10/2012 |
| WO | 2015081550 | A1 | 6/2015 |

* cited by examiner

METHOD FOR ALLOCATING FREQUENCY RESOURCE, APPARATUS, AND COMPUTER-READABLE STORAGE MEDIUM

CROSS REFERENCE TO RELATED APPLICATION

The present application is a U.S. National Phase of International Application No. PCT/CN2020/093446 entitled "COMMUNICATION METHOD AND APPARATUS, AND COMPUTER READABLE STORAGE MEDIUM," and filed on May 29, 2020. The entire contents of the above-listed applications are hereby incorporated by reference for all purposes.

BACKGROUND

With the development of communication technologies, frequency resources used for communication are developing to high frequency. In 5G and pre-5G communication systems, frequency resources are pre-configured to access network devices, and centrally scheduled by the access network devices. However, in the post-5G communication systems, frequency resources are developing to a millimeter wave frequency band and a terahertz frequency band.

SUMMARY

The present disclosure relates to the technical field of communications, in particular to a communication method and apparatus, and a computer-readable storage medium. The technical solutions are as follows:

According to a first aspect of the embodiments of the present disclosure, a communication method is provided, the method includes:
  obtaining first frequency usage record information, the first frequency usage record information is used to indicate frequency occupancy in an available frequency band, and the available frequency band and a terahertz frequency band at least partially overlap; and
  determining an operating frequency of a first access point device according to the first frequency usage record information.

According to a second aspect of the embodiments of the present disclosure, a communication method is provided, the method includes:
  obtaining first frequency usage record information, the first frequency usage record information is used to indicate frequency occupancy in an available frequency band, and the available frequency band and a terahertz frequency band at least partially overlap; and
  sending the first frequency usage record information.

According to a third aspect of the embodiments of the present disclosure, a communication apparatus is provided, the apparatus includes: a processor; and a memory for storing processor-executable instructions; where the processor is configured to load and execute the executable instruction to implement the communication method provided in the first aspect or the second aspect.

According to a fourth aspect of the embodiments of the present disclosure, a non-transitory computer-readable is provided, and when the instructions stored in the non-transitory computer-readable storage medium are executed by a processor, the communication method described in the first aspect or the second aspect is implemented.

It should be understood that the above general description and the following detailed description are only illustrative and explanatory, and cannot limit the present disclosure.

BRIEF DESCRIPTION OF THE DRAWINGS

The accompanying drawings here are incorporated into the specification and constitute a part of the specification, show embodiments consistent with the present disclosure, and are used to explain the principle of the present disclosure together with the specification.

DETAILED DESCRIPTION

Figure 1:
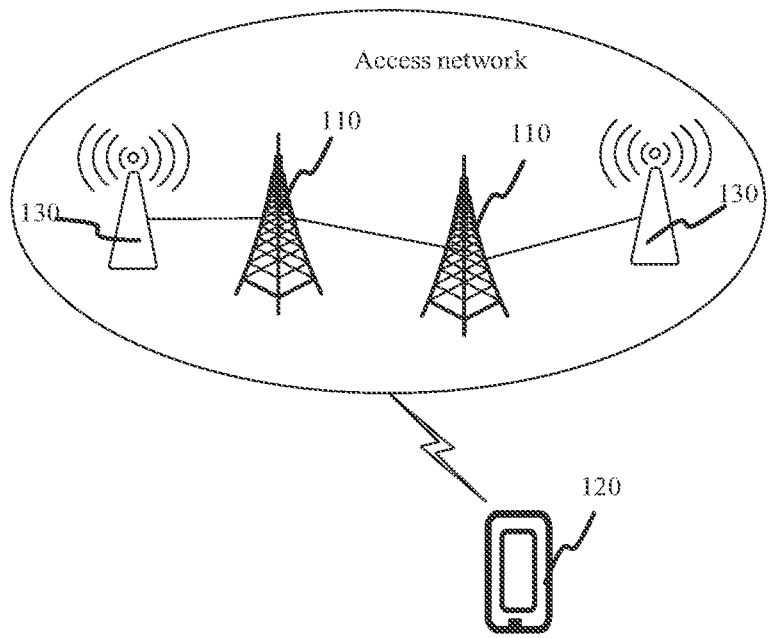
FIG. 1 is a block diagram of a communication system according to an example.

Examples will be described in detail here, and examples are shown in the accompanying drawings. When the following descriptions refer to the drawings, the same numbers in different drawings indicate the same or similar elements, unless otherwise indicated. The implementation manners described in the following examples do not represent all implementation manners consistent with the present disclosure. Instead, they are merely examples of apparatuses and methods consistent with some aspects of the present disclosure described as detailed in the appended claims.

The terms used in the embodiments of the present disclosure are only for the purpose of describing specific embodiments, and are not intended to limit the embodiments of the present disclosure. The terms "a/an," and "the" in the singular form used in the embodiments of the present disclosure and the appended claims are also intended to include the plural form, unless otherwise clearly indicated in the context. It should be further understood that the term "and/or" used in the present disclosure refers to and includes any or all possible combinations of one or more of the associated listed items.

It should be understood that although the terms "first," "second," "third," etc., may be used in the embodiments of the present disclosure to describe various information, the information should not be limited to these terms. These terms are merely used to distinguish the same type of information from one to another. For example, without departing from the scope of the embodiments of the present disclosure, the first information may also be referred to as second information, and similarly, the second information may also be referred to as first information. Depending on the context, the word "if" as used here may be interpreted as "when," "upon," or "in response to determining."

It should be understood that although the steps are described in the manner of numbering for ease of understanding in the embodiments of the present disclosure, these numbers do not represent the execution order of the steps, and also do not represent that the steps numbered sequentially must be executed together. It should be understood that one or more of the plurality of steps numbered sequentially can be executed separately to solve the corresponding technical problems and achieve the predetermined technical solutions. Even if the plurality of steps are listed together in the accompanying drawings, it is not represented that these steps must be executed together; and the accompanying drawings merely list these steps together for ease of understanding.

In a communication system using the millimeter wave frequency band and the terahertz frequency band for communication, a very wide frequency band can be used, and the coverage area of an access network device is relatively small, that is, the number of terminals within the coverage area of one access network device is relatively small, and if the allocation mode of frequency resources in the 5G and pre-5G communication systems is still used, the communication efficiency will be relatively low.

FIG. 1 is a block diagram of a communication system according to an example. Referring to FIG. 1, the communication system may include: an access network device 110 and a terminal 120.

The access network device 110 deployed in a wireless access network is used to provide wireless access function for the terminal 120. The access network device 110 may be a base station (BS). The access network device 110 may communicate wirelessly with the terminal 120 via one or more antennas. The access network device 110 may provide communication coverage for the geographic area where the access network device 110 is located. The base station may include different types of base stations such as a macro base station, a micro base station, a relay station, and an access point. In some embodiments, a base station may be referred to by those skilled in the art as a base station transceiver, a wireless base station, an access point, a wireless transceiver, a basic service set (BSS), an extended service set (ESS), a NodeB, an evolved NodeB (eNB or eNodeB), or some other appropriate terms. For example, in a 5G system, the base station is referred to as gNB. For convenience of description, in the embodiments of the present disclosure, the above-described apparatus for providing a wireless communication function for the terminal 120 is collectively referred to as an access network device 110.

The terminal 120 may be distributed throughout the communication system, and each terminal 120 may be stationary or mobile. The terminal 120 may also be referred to by those skilled in the art as a mobile station, a user station, a mobile unit, a user unit, a wireless unit, a remote unit, a mobile device, a user equipment, a wireless device, a wireless communication device, a remote device, a mobile user station, an access terminal, a mobile terminal, a wireless terminal, a remote terminal, a handheld device, a user agent, a mobile client, a client, or some other appropriate terms. The terminal 120 may be a cellular telephone, a personal digital assistant (PDA), a wireless modem, a wireless communication device, a handheld device, a tablet computer, a laptop computer, a cordless telephone, a wireless local loop (WLL) station, and the like. The terminal 120 can communicate with the access network device 110 in the mobile communication system.

The access network device 110 and the terminal 120 may communicate with each other via an air interface technology, for example, via a cellular technology. A communication link between the access network device 110 and the terminal 120 may include: a down-link (DL) transmission from the access network device 110 to the terminal 120, and/or an up-link (UP) transmission from the terminal 120 to the access network device 110. The down-link transmission may also be referred to as a forward link transmission and the up-link transmission may also be referred to as a reverse link transmission. In some examples, the down-link transmission may include transmission of a discovery signal, which may include a reference signal and/or a synchronization signal.

The mobile communication system shown in FIG. 1 may be a long term evolution (LTE) system, or may be a next-generation evolution system based on the LTE system, such as a LTE-Advanced (LTE-A) system or a 5th generation (5G) system (also referred to as a NR system), or may further be a next-generation evolution system based on the 5G system, such as a beyond 5th generation (B5G) system, a 6th generation (6G) system. In the embodiments of the present disclosure, the terms "system" and "network" are often used interchangeably, but the meaning will be understood by those skilled in the art.

The communication systems and service scenarios described in the embodiments of the present disclosure are intended to more clearly describe the technical solutions of the embodiments of the present disclosure, and do not constitute a limitation on the technical solutions provided by the embodiments of the present disclosure, and it can be seen by those of ordinary skill in the art that the technical solutions provided by the embodiments of the present disclosure are equally applicable to similar technical problems as the communication system evolves and new service scenarios appear.

In the embodiments of the present disclosure, as shown in FIG. 1, a plurality of access network devices 110 are operator access network devices. For example, the plurality of access network devices 110 may be arranged in the same space, for example, in the same building, or the plurality of access network devices 110 may be arranged in the same area, for example, in a square, the available frequency bands of the plurality of access network devices 110 are the same, that is, the plurality of access network devices 110 share a frequency spectrum, and the coverage areas of the plurality of access network devices 110 at least partially overlap, for example, the coverage areas are substantially the same.

Optionally, the plurality of access network devices 110 may be access network devices 110 of the same operator, or may be access network devices 110 including different operators. It should be noted that within a certain area, only one access network device 110 may be arranged.

As shown in FIG. 1, the communication system of the embodiment further includes an access point device 130, where the access point device 130 includes, but is not limited to, a terminal having an access point function, or a router having a signal transceiving function, and the terminal having the access point function can provide a wireless access service for other terminals after the access point function is turned on, and in this case, the terminal can be referred to as an access point device 130, and when the access point function is not turned on, the terminal having the access point function is an ordinary terminal, and can be connected to the access point device 130 or the access network device 110 to implement communication.

Figure 2:
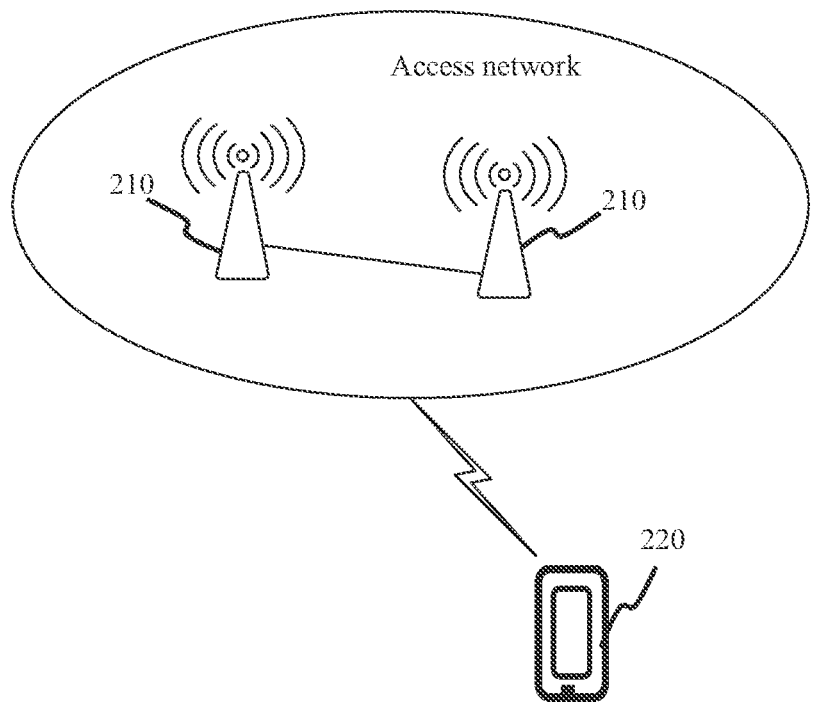
FIG. 2 is a block diagram of a communication system according to an example.

FIG. 2 is a block diagram of a communication system according to an example. Referring to FIG. 2, the communication system may include: a plurality of access point devices 210 and a terminal 220.

The plurality of access point devices 210 may be located in the same space, for example, in the same building, or the plurality of access point devices 210 may be arranged in the same area, for example, in a square, the available frequency bands of the plurality of access point devices 210 are the same, that is, the plurality of access point devices 210 share a frequency spectrum, and the coverage areas of the plurality of access point devices 210 at least partially overlap, for example, the coverage areas are substantially the same. The information can be synchronized among the plurality of access point devices 210 through a set broadcast frequency.

The access point devices 210 include, but are not limited to, a terminal having the access point function, or a router having the signal transceiving function. A related description of the terminal 220 may refer to the terminal 120 in FIG. 1, and details are not described here again.

In the embodiments of the present disclosure, the available frequency band refers to a frequency band that can be used by the access point device, and the available frequency band and the terahertz frequency band at least partially overlap. In a possible implementation, the available frequency band belongs to the terahertz frequency band, that is, the available frequency band is the terahertz frequency band (for example, 0.1 THz-10 THz); or, the available frequency band includes a part of the terahertz frequency band (for example, 0.1 THz-1 THz). In another possible implementation, the available frequency band includes the terahertz frequency band, that is, the terahertz frequency band is a subset of the available frequency band, for example, a combination of a partial millimeter wave frequency band (for example, 60 GHz-300 GHz) close to the terahertz frequency band and the terahertz frequency band (0.1 THz-10 THz), that is, the available frequency band may be 60 GHz-10 THz.

Optionally, the available frequency band is an operator authorized frequency band or a public frequency band.

Figure 3:
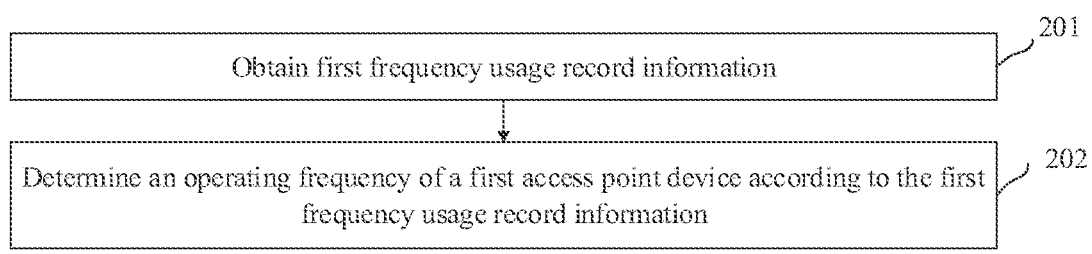
FIG. 3 is a flowchart of a communication method according to an example.

FIG. 3 is a flowchart of a communication method according to an example. The method may be performed by the foregoing access point device, for example, by the access point device 130 in FIG. 1 or the access point device 210 in FIG. 2, and referring to FIG. 3, the method further includes the following steps:

step 201: obtaining first frequency usage record information, the first frequency usage record information is used to indicate frequency occupancy in an available frequency band, and the available frequency band and a terahertz frequency band at least partially overlap; and step 202: determining an operating frequency of a first access point device according to the first frequency usage record information.

Optionally, the frequency occupancy at least indicates an occupied frequency in the available frequency band, and the operating frequency belongs to a frequency that is not included in the first frequency usage record information in the available frequency band. The occupied frequency may be a frequency occupied by other communication devices for communication.

Optionally, the frequency occupancy further indicates an unoccupied frequency in the available frequency band, and the operating frequency belongs to the unoccupied frequency.

Optionally, obtaining the first frequency usage record information includes:

receiving the first frequency usage record information on a set broadcast frequency.

Optionally, determining the operating frequency of the first access point device according to the first frequency usage record information includes:

determining a first frequency according to the first frequency usage record information, the first frequency belongs to a frequency that is not included in the first frequency usage record information in the available frequency band; and sending a frequency occupation request, the frequency occupation request includes indication information of the first frequency.

Optionally, determining the operating frequency of the first access point device according to the first frequency usage record information further includes:

obtaining second frequency usage record information, the second frequency usage record information is generated according to the frequency occupation request; and determining the first frequency as the operating frequency, in response to determining that the second frequency usage record information includes a usage record indicating that the first access point device occupies the first frequency.

Optionally, the method further includes: sending the second frequency usage record information, the second frequency usage record information includes a usage record associated with the operating frequency of the first access point device, and the first frequency usage record information.

Optionally, the usage record indicating that the first access point device occupies the first frequency includes an identifier of the first access point device and the indication information of the first frequency.

Optionally, the method further includes: sending a first signal on the operating frequency, the first signal is used to establish a communication connection with a terminal.

Optionally, the method further includes at least one of the following steps:

receiving a first frequency release notification from an access network device, the first frequency release notification is used to indicate the first access point device to release the operating frequency; or sending a second frequency release notification, the second frequency release notification is used to notify that the first access point device will release the operating frequency; or receiving a third frequency release notification, the third frequency release notification is used to notify that the operating frequency of a second access point device will be released.

Optionally, the first frequency usage record information includes at least one frequency usage record, and each frequency usage record includes: an identifier of an access point device and indication information of a used frequency.

Optionally, the available frequency band belongs to the terahertz frequency band; or the available frequency band includes a part of the terahertz frequency band, or the available frequency band includes the terahertz frequency band.

It should be noted that the foregoing steps 201 and 202 and the foregoing optional steps may be combined in any combination.

Figure 4:
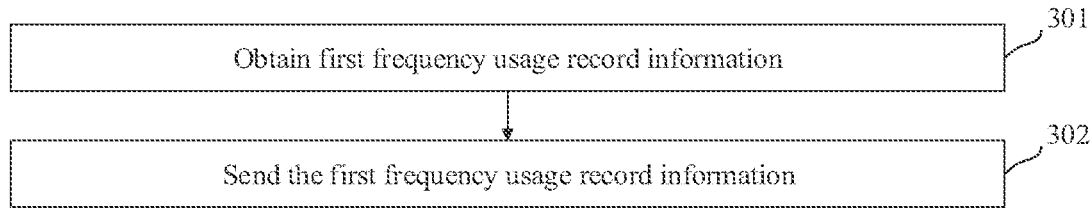
FIG. 4 is a flowchart of a communication method according to an example.

FIG. 4 is a flowchart of a communication method according to an example. The method may be performed by the foregoing access network device constructed by the operator, for example, by the access network device 110 in FIG. 1, and referring to FIG. 4, the method further includes the following steps:

step 301: obtaining first frequency usage record information, the first frequency usage record information is used to indicate frequency occupancy in an available frequency band, and the available frequency band and a terahertz frequency band at least partially overlap; and step 302: sending the first frequency usage record information.

Optionally, obtaining the first frequency usage record information includes:

obtaining frequency allocation record information of at least two access network devices, the frequency allocation record information is used to indicate frequencies allocated by the access network devices; and obtaining the first frequency usage record information according to the frequency allocation record information.

Optionally, sending the first frequency usage record information includes:

periodically broadcasting the first frequency usage record information on a set broadcast frequency.

Optionally, the method further includes:

receiving a frequency occupation request from a first access point device, the frequency occupation request includes indication information of a first frequency, and the first frequency belongs to a frequency that is not included in the first frequency usage record information in the available frequency band;

generating second frequency usage record information based on the frequency occupation request;

sending the second frequency usage record information.

Optionally, generating the second frequency usage record information based on the frequency occupation request includes:

in response to determining that the first frequency for the frequency occupation request from the first access point device and a first frequency for a frequency occupation request from another access point device at least partially overlap, adding a usage record associated with a frequency corresponding to an earlier frequency occupation request indicated by a timestamp to the first frequency usage record information, to obtain the second frequency usage record information.

Optionally, the method further includes at least one of the following steps:

sending a first frequency release notification to an access point device, the first frequency release notification is used to indicate the access point device to release the operating frequency; or receiving a second frequency release notification from the access point device, the second frequency release notification is used to notify the access network device that the access point device will release the operating frequency.

Optionally, the at least two access network devices are access network devices of the same operator, or the at least two access network devices include access network devices of different operators.

Optionally, the frequency occupancy at least indicates an occupied frequency in the available frequency band. In addition, the frequency occupancy further indicates an unoccupied frequency in the available frequency band.

Optionally, the first frequency usage record information includes at least one frequency usage record, and each frequency usage record includes: an identifier of the access point device and indication information of a used frequency.

Optionally, the available frequency band belongs to the terahertz frequency band; or the available frequency band includes a part of the terahertz frequency band, or the available frequency band includes the terahertz frequency band.

It should be noted that the foregoing steps 301 and 302 and the foregoing optional steps may be combined in any combination.

Figure 5:
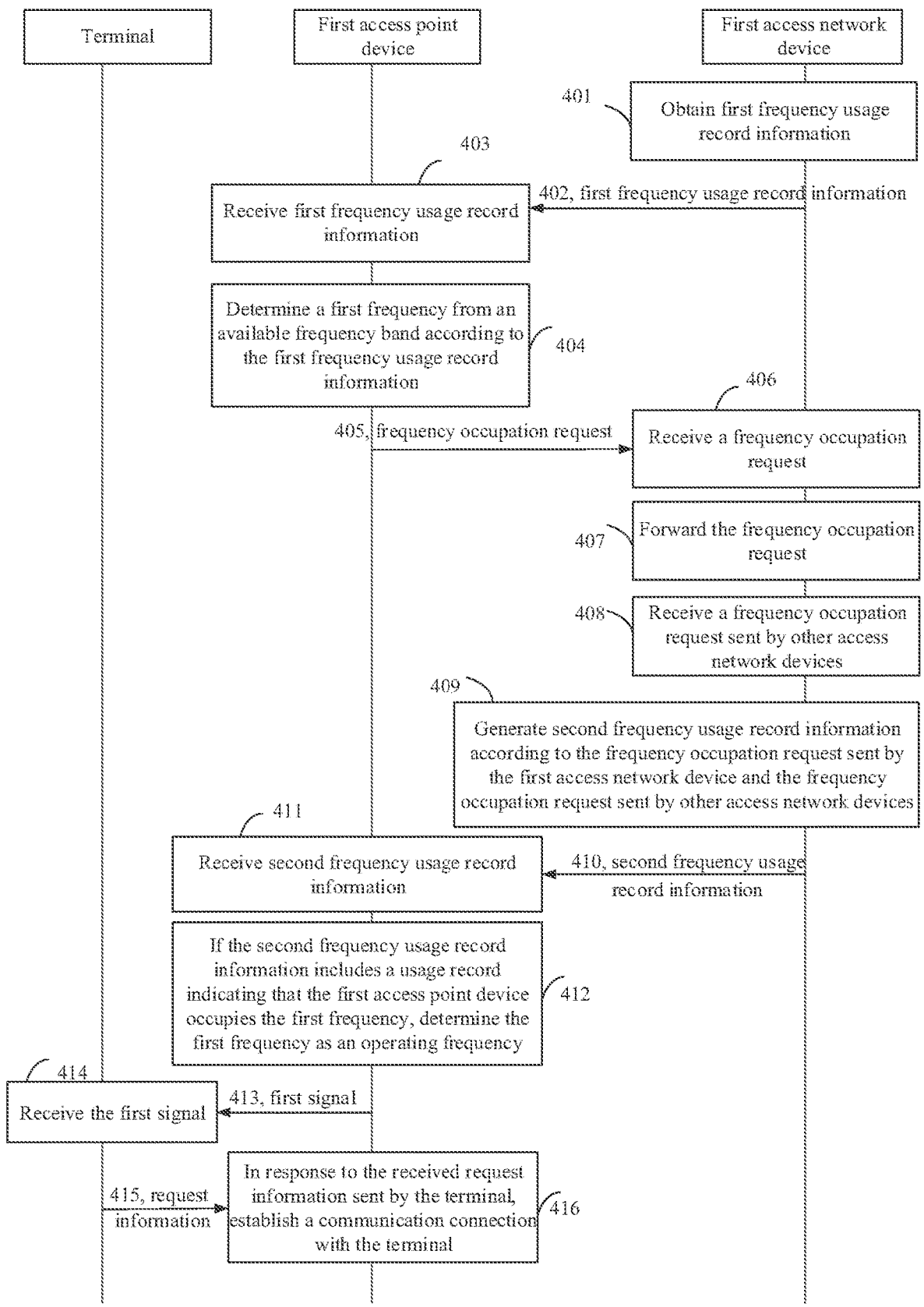
FIG. 5 is a flowchart of a communication method according to an example.

FIG. 5 is a flowchart of a communication method according to an example. In the embodiment shown in FIG. 5, the access point device needs to obtain frequency usage record information from the access network device constructed by the operator and to notify the connected access network device of the determined operating frequency. Referring to FIG. 5, the method further includes the following steps:

in step 401, a first access network device obtains first frequency usage record information.

The first frequency usage record information is used to indicate frequency occupancy in an available frequency band. The available frequency band and a terahertz frequency band at least partially overlap. The frequency occupancy at least indicates an occupied frequency in the available frequency band.

In a first possible implementation, the frequency occupancy indicates an occupied frequency in the available frequency band, that is, the first frequency usage record information is used to indicate an occupied frequency in the available frequency band.

For example, the first frequency usage record information includes a plurality of frequency usage records, and each frequency usage record includes: an identifier of an access point device and an identifier of a used frequency. Optionally, the frequency usage record may further include a timestamp corresponding to the used frequency.

In a second possible implementation, the frequency occupancy indicates an occupied frequency and an unoccupied frequency in the available frequency band.

For example, the available frequency band is pre-divided into a plurality of frequency ranges, and the first frequency usage record information includes the plurality of frequency ranges and occupancy corresponding to each frequency range. For example, if a frequency range is occupied, an identifier of an access point device occupying the frequency range is correspondingly arranged for the frequency range in the first frequency usage record information; and if a frequency range is unoccupied, there is no corresponding identifier of the access point device for the frequency range.

The following takes the first possible implementation as an example to give a description of the embodiments of the present disclosure. However, other optional implementations of the second possible implementation are apparent to those skilled in the art with reference to the following description of the first possible implementation, and details are not described here again. It should be understood that these optional implementations are also included within the scope of the disclosure.

Optionally, when there is only one access network device in the coverage area of the first access network device, the obtained first frequency usage record information includes first frequency allocation record information, that is, a record of the frequencies allocated out by the first access network device itself. Or when there is more than one access network device in the coverage area of the first access network device, that is, the coverage areas of the first access network device and at least one second access network device at least partially overlap and the available frequency bands of the first access network device and the second access network device are the same, and then the first frequency usage record information includes first frequency allocation record information and second frequency allocation record information, where the first frequency allocation record information is used to indicate the frequency allocated out by the first access network device, and the second frequency allocation record information is used to indicate the frequency allocated out by the second access network device.

For example, the frequency allocation record information may include an identifier of the access point device and indication information of the allocated frequency.

For the first access network device, first frequency allocation record information corresponding to the frequency allocated out by the first access network device itself may be stored in a storage unit of the first access network device, and the first frequency allocation record information may be obtained by reading from the storage unit.

Optionally, obtaining frequency allocation record information of the second access network device by the first access network device may include:
receiving frequency allocation record information sent by the second access network device via a wired interface or an air interface.

Optionally, the first frequency usage record information is empty when all access network devices do not allocate frequencies.

In step 402, the first access network device sends the first frequency usage record information.

For example, the step 402 includes: periodically broadcasting first frequency usage record information on a set broadcast frequency. Here, the broadcast frequency refers to a frequency used to send a broadcast message.

Optionally, the broadcast frequency is fixed. By periodically broadcasting the first frequency usage record information on the set broadcast frequency, the access point device can be notified of the current frequency usage record information in time.

In step 403, the first access point device receives the first frequency usage record information sent by the first access network device.

For example, the first access point device may receive the first frequency usage record information on the set broadcast frequency.

The first access point device chooses to access the system through the first access network device, and then receives the first frequency usage record information sent by the first access network device.

Optionally, the step 403 may be performed when the first access point device is powered on or when the first access point device turns on an access point function. When the first access point device is powered on, frequency usage record information needs to be obtained first, an idle frequency resource is determined from available frequency band resources according to the frequency usage record information, and then a frequency resource to be used by itself is selected from the idle frequency resource, that is, an operating frequency.

In step 404, the first access point device determines a first frequency from the available frequency band according to the first frequency usage record information.

The first frequency belongs to a frequency that is not included in the first frequency usage record information in the available frequency band.

For example, the first access point device can determine a first frequency matching the bandwidth capability of the first access point device from a remaining frequency according to the bandwidth capability of the first access point device, that is, a frequency domain width of the first frequency does not exceed a bandwidth supported by the first access point device.

Alternatively, the first access point device may determine a first frequency matching the authorized bandwidth from the remaining frequency according to the authorized bandwidth authorized for use by the operator, that is, the frequency domain width of the first frequency does not exceed the bandwidth supported by the first access point device.

Here, the remaining frequency is the unoccupied frequency in the available frequency band. When the first frequency usage record information is used to indicate an occupied frequency in the available frequency band, the remaining frequency is a frequency that is not included in the first frequency usage record information in the available frequency band, that is, a frequency other than the frequency included in the first frequency usage record information in the available frequency band.

In step 405, the first access point device sends a frequency occupation request, and the frequency occupation request includes indication information of the first frequency.

The frequency occupation request is used to indicate that the first access point device desires to use the first frequency as the operating frequency of the first access point device to facilitate communication with the terminal on the operating frequency.

For example, the indication information of the first frequency includes a start position and an offset amount of the frequency, the offset amount represents an offset of an end position of the frequency with respect to the start position, and based on the start position and the offset amount, the end position of the frequency can be obtained.

Optionally, the frequency occupation request further includes an identifier of the first access point device and a timestamp.

In step 406, the first access network device receives the frequency occupation request.

In step 407, the first access network device forwards the frequency occupation request.

Accordingly, the frequency occupation request is received by other access network devices that at least partially overlap with the coverage area of the first access network device.

In a possible implementation, the frequency occupation request includes a usage record associated with the first frequency, that is, the usage record indicating that the first access point device occupies the first frequency; alternatively, in another possible implementation, the frequency occupation request includes a combination of the usage record indicating that the first access point device occupies the first frequency and a frequency usage record in the first frequency usage record information.

In step 408, the first access network device receives a frequency occupation request sent by other access network devices.

The frequency occupation request sent by the other access network devices is sent by the other access point devices which request a frequency through other access network devices.

In step 409, the first access network device generates second frequency usage record information according to the frequency occupation request sent by the first access network device and the frequency occupation request sent by other access network devices.

It can be implemented by the steps 407 to 409 that the access network devices in the area synchronize the frequency occupation requests and generate second frequency usage record information based on the same rule. It should be noted that the steps 407 to 409 do not need to be performed if there are no other access network devices in the coverage area of the first access network device.

It should be noted that the mutual sending and receiving of information between the access network devices may be implemented via a wired interface or an air interface, and the air interface is different from an interface where the access network devices broadcast frequency usage record information to the access point devices and terminals.

The step 409 may include that the first access network device determines, according to the frequency occupation request sent by the first access point device and the frequency occupation request sent by other access network devices, whether there is a conflict (that is, whether there is the same frequency) in the operating frequencies requested by the access point devices accessed by the plurality of access network devices; and when there is a conflict between the operating frequencies selected by different access point devices, it can be determined which access point device can use the operating frequencies according to the timestamp in the frequency occupation request to ensure that the operating frequencies of the terminals do not conflict.

For example, the first access network device may add the operating frequency corresponding to the frequency occupation request with an earlier timestamp to the second frequency usage record information.

In step 410, the first access network device sends the second frequency usage record information.

The step 410 may refer to the step 402, and details are not described here again.

In step 411, the first access point device receives the second frequency usage record information.

In step 412, if the second frequency usage record information includes a usage record indicating that the first access point device occupies the first frequency, the first frequency is determined as the operating frequency.

If the second frequency usage record information does not include the usage record indicating that the first access point device occupies the first frequency, the second frequency usage record information is determined as the first frequency usage record information, and the steps 404 to 411 are executed again until the operating frequency is determined.

Here, the usage record indicating that the first access point device occupies the first frequency includes the identifier of the first access point device and an identifier of the operating frequency.

In step 413, the first access point device sends the first signal on the operating frequency.

Optionally, the first signal is a pilot signal. The terminal may access the first access point device based on the pilot signal by receiving the pilot signal.

In step 414, the terminal receives the first signal.

In step 415, the terminal sends request information according to the first signal.

In step 416, the first access point device establishes a communication connection with the terminal in response to the received request information sent by the terminal.

After the communication connection is established, the terminal may communicate with the first access point device on the operating frequency.

Optionally, the method may further include that: the first access network device sends a first frequency release notification and the first frequency release notification is used to indicate the first access point device to release the operating frequency.

Optionally, the first access network device may broadcast the frequency release notification such that the first frequency release notification can be received by the access point devices accessed through the first access network device; or, the first access network device sends the first frequency release notification to merely some of the access point devices accessed through the first access network device.

Accordingly, the method may further include that: the first access point device receives the frequency release notification sent by the first access network device, and the first access point device releases the operating frequency according to the frequency release notification.

The access network device indicates the access point device to release the operating frequency, such that the frequency resources can be used more flexibly.

Optionally, the method may further include that: the first access point device sends a second frequency release notification to the first access network device, and the second frequency release notification is used to notify the access network device that the access point device will release the operating frequency.

Optionally, the first access point device sends the second frequency release notification prior to powering off and/or hibernating. In the case where the first access point device does not need to use the operating frequency, the first access network device is notified via the second frequency release notification, so that the first access network device can timely include the operating frequency corresponding to the first access point device into the unoccupied frequency in the available frequency band, for example, the frequency usage record corresponding to the operating frequency of the first access point device is deleted from the frequency usage record information to facilitate subsequent use for other access point devices, so as to improve the utilization rate of frequency resources.

In the related art, the access network device uses a centralized resource scheduling method to control the operating frequency of the access point device; however, in the embodiments of the present disclosure, the access point device can select the operating frequency according to the occupied frequency, and the access network device only plays the role of information transmission; in the case where the available frequency band and the terahertz frequency band at least partially overlap, a frequency domain range of the available frequency band is relatively wide, a transmission distance of a signal of the frequency band is relatively short, and a coverage area of the access point device capable of operating in the frequency band is relatively small; therefore, the scheduling of frequency resources can be performed by means of distributed resource management to improve the communication efficiency and simplify the operating process of the access point device.

Figure 6:
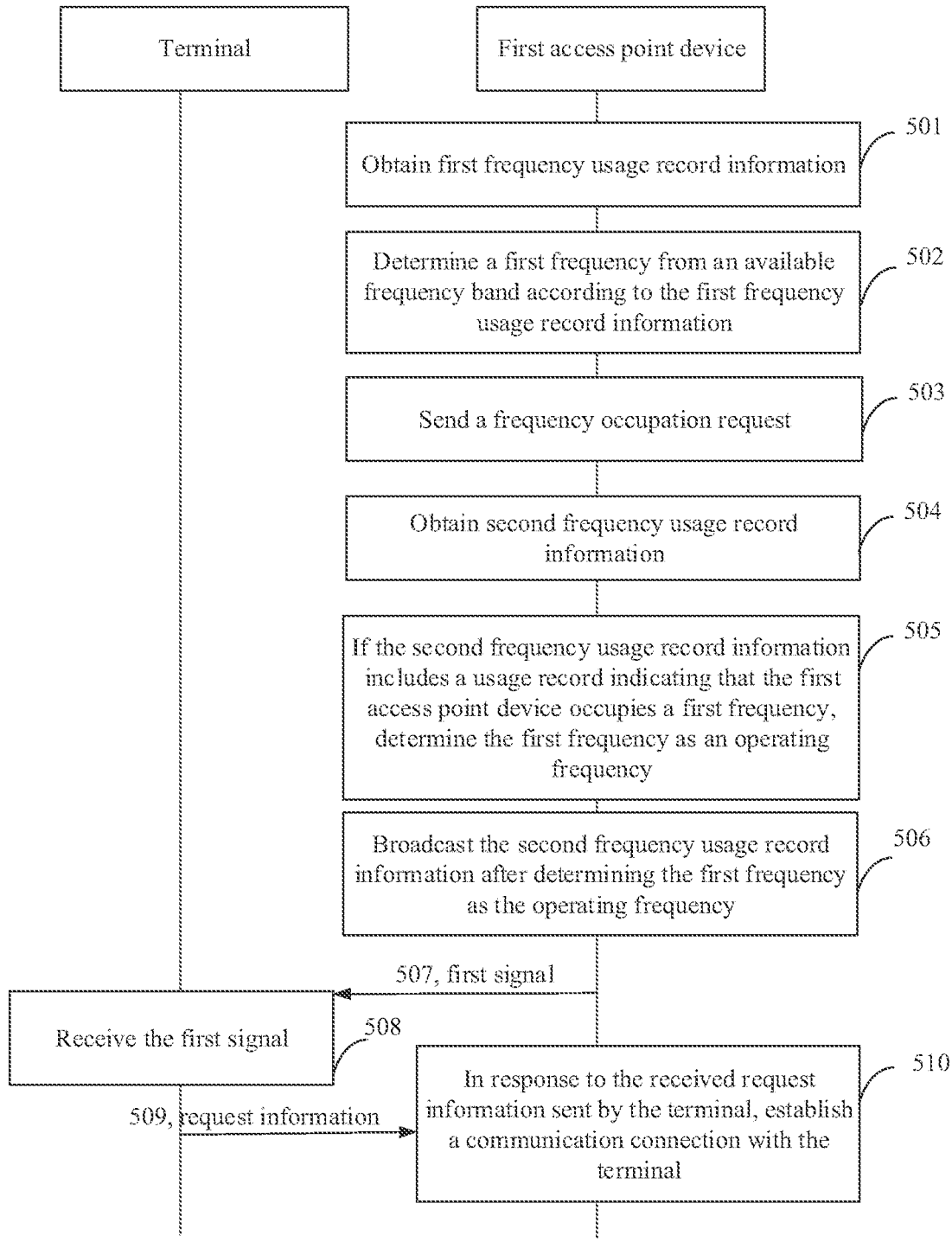
FIG. 6 is a flowchart of a communication method according to an example.

FIG. 6 is a flowchart of a communication method according to an example. A difference between the embodiment shown in FIG. 5 lies in that in the embodiment shown in FIG. 5, the first access point device needs to obtain frequency usage record information from the access network device constructed by an operator, while in the embodiment shown in FIG. 6, the first access point device obtains frequency usage record information directly from other access point devices.

Referring to FIG. 6, the method further includes the following steps:

in step 501, the first access point device obtains the first frequency usage record information.

With respect to related content of the first frequency usage record information, reference can be made to step 401, and details are not described here again.

Optionally, the step 501 may be performed when the first access point device is powered on or when the first access point device turns on the access point function.

Optionally, the first access point device receives frequency usage record information on the set broadcast frequency. For example, the set broadcast frequency is a fixed frequency, and a second access point device in a normal operation state may periodically broadcast frequency usage record information on the broadcast frequency, so that a newly powered-on first access point device can be notified of current frequency usage record information in time, and the frequency usage record information between various second access point devices can be kept synchronized.

In step 502, the first access point device determines the first frequency in the available frequency band according to the first frequency usage record information.

The first frequency belongs to the unoccupied frequency in the available frequency band.

For example, the first access point device can determine a first frequency matching the bandwidth capability of the first access point device from a remaining frequency according to the bandwidth capability of the first access point device, that is, a frequency domain width of the first frequency does not exceed a bandwidth supported by the first access point device.

Alternatively, the first access point device may determine a first frequency matched to the authorized bandwidth from the remaining frequency according to the authorized bandwidth authorized for use by the operator, that is, the frequency domain width of the first frequency does not exceed the bandwidth supported by the first access point device.

Here, the remaining frequency is the unoccupied frequency in the available frequency band. When the first frequency usage record information is used to indicate an occupied frequency in the available frequency band, the remaining frequency is a frequency that is not included in the first frequency usage record information in the available frequency band, that is, a frequency other than the frequency included in the first frequency usage record information in the available frequency band.

In step 503, the first access point device sends the frequency occupation request.

The first access point device may broadcast the frequency occupation request. The frequency occupation request includes indication information of the first frequency. The frequency occupation request is used to represent that the first access point device desires to use the first frequency as the operating frequency.

For example, the indication information of the first frequency may include a start position and an offset amount of the first frequency. The offset amount represents an offset of an end position of the frequency with respect to the start position, and based on the start position and the offset amount, the end position of the frequency can be obtained.

In step 504, the first access point device obtains second frequency usage record information, and the second frequency usage record information is obtained according to the frequency occupation request.

In the step 504, the first access point device receives the second frequency usage record information broadcast by the second access point device on the set broadcast frequency. The second frequency usage record information broadcast by the second access point device is generated by the second access point device according to the received frequency occupation request and the first frequency usage record information.

A manner in which the second access point device generates the second frequency usage record information may be referred to the foregoing step 409, and detailed descriptions are omitted here.

In step 505, if the second frequency usage record information includes a usage record indicating that the first access point device occupies the first frequency, the first access point device determines the first frequency as the operating frequency.

It should be noted that if the second frequency usage record information does not include the usage record indicating that the first access point device occupies the first frequency, the first access point device uses the second frequency usage record information as the foregoing first frequency usage record information, and the steps 502 to 504 are performed again until the first access point device determines the operating frequency.

In step 506, the first access point device broadcasts the second frequency usage record information after determining the first frequency as the operating frequency.

In step 507, the first access point device sends the first signal on the determined operating frequency.

Optionally, the first signal is a pilot signal. The terminal may access the first access point device based on the pilot signal by receiving the pilot signal.

In step 508, the terminal receives the first signal.

In step 509, the terminal sends request information according to the first signal.

In step 510, the first access point device establishes a communication connection with the terminal in response to the received request information sent by the terminal.

After the communication connection is established, the terminal and the first access point device may communicate on the operating frequency.

It should be noted that if there are no other access point devices in a normal operation state within the coverage area of the first access point device before the first access point device performs the step 501, the first access point device will not receive the first frequency usage record information. Accordingly, the method further includes: if the first access point device does not receive the first frequency usage record information within a set duration, directly determining the operating frequency of the first access point device from the available frequencies.

In a possible implementation, the frequency range of the frequency band near the terahertz frequency band is relatively wide, the frequency resources are sufficient, the two access point devices are powered on at the same time, and the possibility that the selected operating frequencies conflict with each other is extremely low, therefore, the first access point device can directly use a frequency selected from the available frequency band as the operating frequency and send the first signal on the operating frequency in the case where the first access point device does not receive the first frequency usage record information within the set duration.

In another possible implementation, in the case where the first access point device does not receive the first frequency usage record information within the set duration, the first access point device may send the frequency occupation request (see the foregoing step 503 for related content); and the first access point device receives a frequency occupation request sent by other access point devices. If the frequency occupation request sent by other access point devices is not received within the set duration, the first frequency is used as the operating frequency. If the frequency occupation request sent by other access point devices is received within the set duration, according to a set rule, whether the frequency occupation request sent by the first access point device can take effect is determined. If the frequency occupation request sent by the first access point device can take effect, the first frequency is used as the operating frequency, and if the frequency occupation request sent by the first access point device cannot take effect, a frequency is reselected to send a corresponding frequency occupation request.

For example, an effective frequency occupation request may be determined according to a timestamp, for example, if the timestamp of the frequency occupation request sent by the first access point device is earlier than the timestamps of the frequency occupation requests sent by other access point devices, the frequency occupancy request can take effect. If the timestamp of the frequency occupation request sent by the first access point device is later than the timestamps of the frequency occupation requests sent by other access point devices, the frequency occupancy request cannot take effect.

Optionally, when the first access point device no longer needs to use the operating frequency, for example, hibernating or powering off, the method may further include: sending a second frequency release notification, the second frequency release notification is used to notify that the operating frequency of the first access point device is to be released, that is, the second frequency release notification is used to notify that the first access point device will release the operating frequency.

Optionally, the method further includes that: the first access point device receives a third frequency release notification sent by other access point devices, and the third frequency release notification is used to notify that the operating frequency of a second access point device is to be released. The third frequency release notification may be sent when the second access point device no longer needs to use the corresponding operating frequency.

After receiving the frequency release notification, other access point devices within the coverage area of the first access point device may update frequency usage record information, for example, the frequency usage record corresponding to the operating frequency of the first access point device is deleted from the frequency usage record information.

In the related art, the access network device uses a centralized resource scheduling method to control the operating frequency of the access point device, or pre-configure the operating frequency for the access point device; however, in the embodiments of the present disclosure, the access point device can select the operating frequency according to the occupied frequency; in the case where the available frequency band and the terahertz frequency band at least partially overlap, the frequency domain range of the available frequency band is relatively wide, the transmission distance of a signal of the frequency band is relatively short, and the coverage area of the access point device capable of operating in the frequency band is relatively small; therefore, the allocation of frequency resources can be performed by means of distributed resource management to improve the communication efficiency and simplify the operating process of the access point device.

The following takes a specific example to give a description of the embodiments of the present disclosure.

When AP1 is powered on, there is no AP other than the AP1 operating in the area where the AP1 is located; if the AP1 does not receive frequency usage record information from a broadcast frequency, then a frequency 1 is selected from the available frequency band as the operating frequency, and a pilot signal is sent on the frequency 1; and, a first device broadcasts first frequency usage record information on the broadcast frequency, the first frequency usage record information includes a usage record associated with the frequency 1, and the usage record associated with the frequency 1 includes an identifier of the AP1, indication information of the frequency 1, and a timestamp.

Subsequently, AP2 and AP3 are powered on, and the AP1 operates normally, the AP2 and the AP3 receive the first frequency usage record information sent by the AP1 from the broadcast frequency, the AP2 determines a frequency 2 of the AP2 from the remaining frequencies, and the AP3 determines a frequency 3 of the AP3 from the remaining frequencies. The AP2 sends a frequency occupation request carrying indication information of the frequency 2, and the AP3 sends a frequency occupation request carrying indication information of the frequency 3.

The AP1 receives the frequency occupation requests sent by the AP2 and the AP3; if the frequency 2 and the frequency 3 conflict with each other, according to the timestamp in the frequency occupation requests sent by the AP2 and the AP3, it is determined that the frequency occupation request with an earlier timestamp takes effect, and second frequency usage record information is generated; and it is assumed that the occupation request corresponding to the frequency 2 take effect, the second frequency usage record information includes frequency usage records corresponding to the frequency 1 and the frequency 2. If the frequency 2 and the frequency 3 do not conflict with each other, second frequency usage record information is generated, and the second frequency usage record information includes frequency usage records corresponding to the frequency 1, the frequency 2, and the frequency 3. The AP1 broadcasts the second frequency usage record information.

The AP2 receives the second frequency usage record information, and if the second frequency usage record information includes the frequency usage record corresponding to the frequency 2, a pilot signal is sent on the frequency 2, so that the terminal accesses the AP2. If the second frequency usage record information does not include the frequency usage record corresponding to the frequency 2, a frequency 2 is reselected and a new frequency occupation request is sent until the received frequency usage record information includes the frequency 2 in the frequency occupation request sent by the AP2.

The AP3 receives the second frequency usage record information, and if the second frequency usage record information includes the frequency usage record corresponding to the frequency 3, a pilot signal is sent on the frequency 3, so that the terminal accesses the AP3.

In addition, the AP2 and the AP3 periodically broadcast the second frequency usage record information on the set broadcast frequency after starting to send the pilot signal.

When AP4 is powered on, the AP4 receives second frequency usage record information broadcast by at least one of the AP1, the AP2 and the AP3, and determines a frequency 4 of the AP4 from the remaining frequencies, and the AP4 sends a frequency occupation request carrying indication information of the frequency 4. After receiving the frequency occupation request, the AP1, the AP2, and the AP3 generate third frequency usage record information, the third frequency usage record information includes frequency usage records corresponding to the frequencies 1 to 4. The AP1, the AP2, and the AP3 broadcast the third frequency usage record information. After receiving the third frequency usage record information, the AP4 sends a pilot signal on the frequency 4 and periodically broadcasts the third frequency usage record information.

Figure 7:
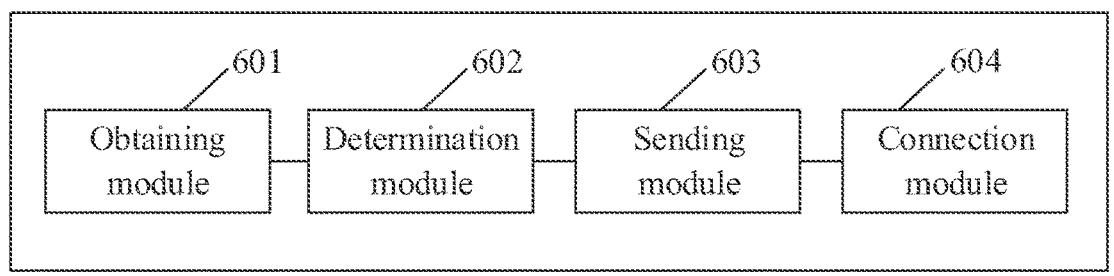
FIG. 7 is a schematic structural diagram of a communication apparatus according to an example.

FIG. 7 is a schematic structural diagram of a communication apparatus according to an example. The apparatus has the function of implementing the access point device in the above-mentioned method embodiment, and the function can be implemented by hardware or can be implemented by executing corresponding software by hardware. As shown in FIG. 7, the apparatus includes: an obtaining module 601 and a determination module 602.

The obtaining module 601 is configured to obtain first frequency usage record information, the first frequency usage record information is used to indicate frequency occupancy in an available frequency band, and the available frequency band and a terahertz frequency band at least partially overlap; and the determination module 602 is configured to determine an operating frequency of a first access point device according to the first frequency usage record information.

Optionally, the frequency occupancy at least indicates an occupied frequency in the available frequency band, and the operating frequency belongs to a frequency in the available frequency band that is not included in the first frequency usage record information.

Optionally, the frequency occupancy further indicates an unoccupied frequency in the available frequency band, and the operating frequency belongs to the unoccupied frequency.

Optionally, the obtaining module 601 is configured to receive the first frequency usage record information on a set broadcast frequency.

Optionally, the determination module 602 includes:
a first determination submodule, configured to determine a first frequency according to the first frequency usage record information, the first frequency belongs to a frequency that is not included in the first frequency usage record information in the available frequency band; and
a sending submodule, configured to send a frequency occupation request, the frequency occupation request includes indication information of the first frequency.

Optionally, the determination module further includes:
an obtaining submodule, configured to obtain second frequency usage record information, the second frequency usage record information is generated according to the frequency occupation request; and
a second determination submodule, configured to determine the first frequency as the operating frequency, in response to determining that the second frequency usage record information includes the usage record indicating that the first access point device occupies the first frequency.

Optionally, the apparatus further includes: a sending module 603.

The sending module 603 is configured to send second frequency usage record information, the second frequency usage record information includes a usage record associated with the operating frequency of the first access point device, and the first frequency usage record information.

Or the sending module 603 is configured to send a first signal on the operating frequency, the first signal is used to establish a communication connection with a terminal. As shown in FIG. 7, the apparatus may further include a connection module 604, so that the first signal can be used by the connection module 604 to establish the communication connection with the terminal.

Optionally, the apparatus further includes a receiving module, configured to receive a first frequency release notification from an access network device, the first frequency release notification is used to indicate the first access point device to release the operating frequency; or configured to receive a third frequency release notification, and the third frequency release notification is used to notify that the operating frequency of a second access point device is to be released.

Optionally, the sending module 603 is further configured to send a second frequency release notification, the second frequency release notification is used to notify that the first access point device will release the operating frequency.

Figure 8:
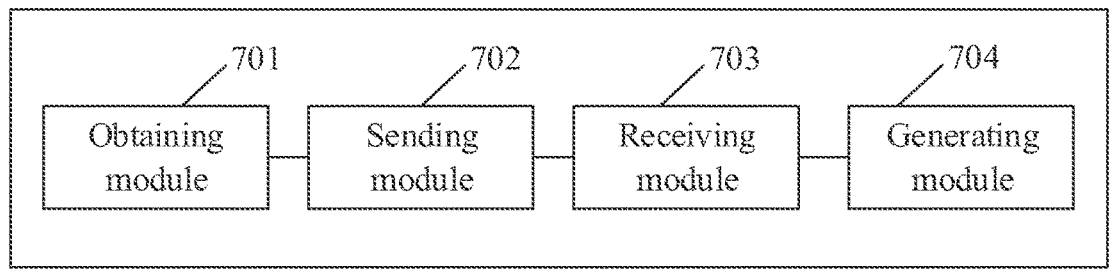
FIG. 8 is a schematic structural diagram of a communication apparatus according to an example.

FIG. 8 is a schematic structural diagram of a communication apparatus according to an example. The apparatus has the function of implementing the access network device in the above-mentioned method embodiment, and the function can be implemented by hardware or can be implemented by executing corresponding software by hardware. As shown in FIG. 8, the apparatus includes: an obtaining module 701, and a sending module 702.

The obtaining module 701 is configured to obtain first frequency usage record information, the first frequency usage record information is used to indicate frequency occupancy in an available frequency band, and the available frequency band and a terahertz frequency band at least partially overlap; and the sending module 702 is configured to send the first frequency usage record information.

Optionally, the obtaining module 701 is configured to obtain frequency allocation record information of at least two access network devices, the frequency allocation record information is used to indicate frequencies allocated by the access network devices; and obtain the first frequency usage record information according to the frequency allocation record information.

Optionally, the sending module 702 is configured to periodically broadcast the first frequency usage record information on a set broadcast frequency.

Optionally, the apparatus further includes: a receiving module 703 and a generating module 704.

The receiving module 703 is configured to receive a frequency occupation request from a first access point device, the frequency occupation request includes indication information of a first frequency, and the first frequency belongs to an unoccupied frequency in the available frequency band; the generating module 704 is configured to generate second frequency usage record information based on the frequency occupation request; and the sending module 702 is further configured to send the second frequency usage record information.

Optionally, the generating module 704 is configured to, in response to determining that the first frequency for the frequency occupation request from the first access point device and a first frequency for a frequency occupation request from another access point device at least partially overlap, add a usage record associated with a frequency corresponding to an earlier frequency occupation request indicated by a timestamp to the first frequency usage record information, to obtain the second frequency usage record information.

Optionally, the sending module 702 is further configured to send a first frequency release notification, the first frequency release notification is used to indicate the access point device to release the operating frequency.

Optionally, the receiving module 703 is further configured to receive a second frequency release notification from the access point device, and the second frequency release notification is used to notify the access network device that the access point device will release the operating frequency.

Optionally, the at least two access network devices are access network devices of the same operator, or the at least two access network devices include access network devices of different operators.

Optionally, the frequency occupancy at least indicates an occupied frequency in the available frequency band. The frequency occupancy further indicates an unoccupied frequency in the available frequency band.

Figure 9:
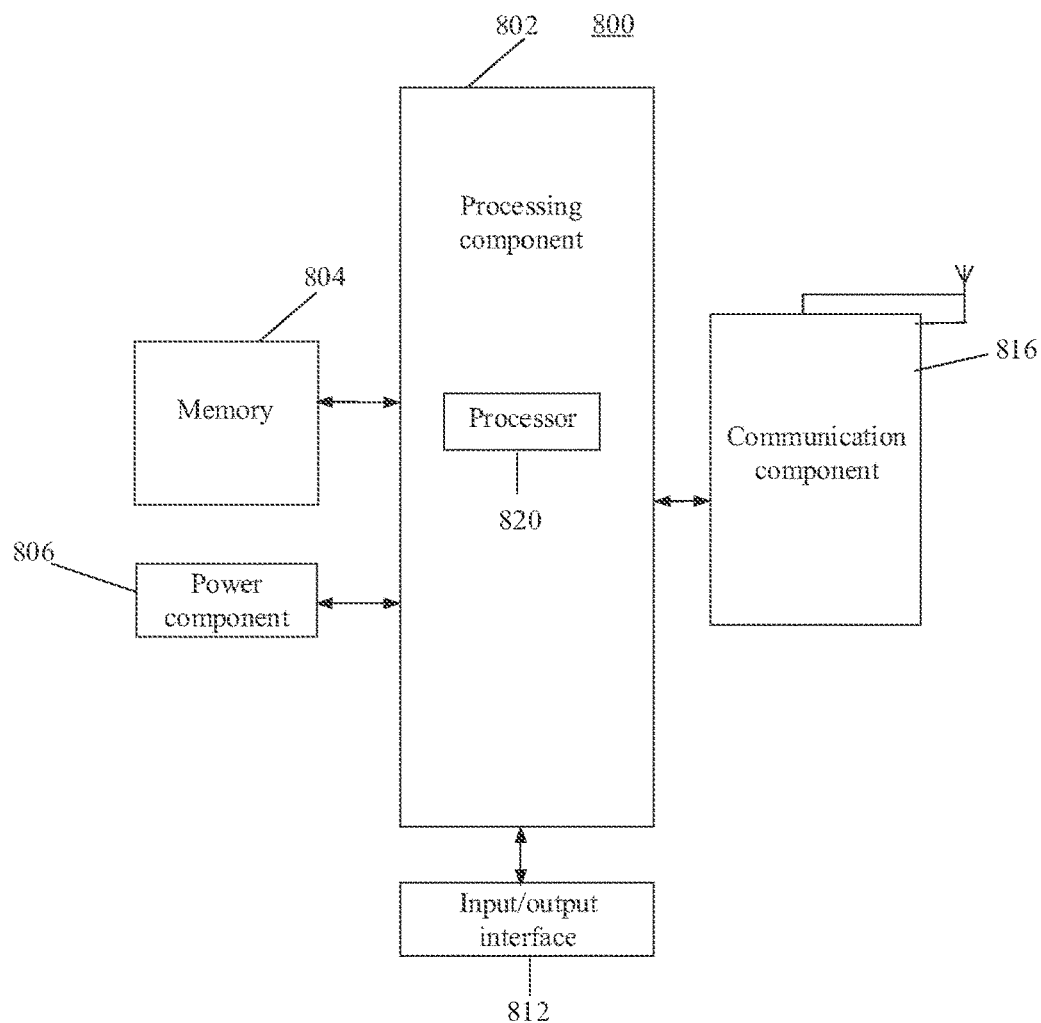
FIG. 9 is a block diagram of a communication apparatus according to an example.

FIG. 9 is a block diagram of a communication apparatus 800 according to an example, and the apparatus 800 may be the foregoing access network device. Referring to FIG. 9, the communication apparatus 800 may include one or more of the following components: a processing component 802, a memory 804, a power component 806, an input/output (I/O) interface 812, and a communication component 816.

The processing component 802 usually controls the overall operations of the communication apparatus 800, such as operations associated with display, telephone call, data communication, camera operation, and recording operation. The processing component 802 may include one or more processors 820 to execute instructions to complete all of or part of the steps of the above method. In addition, the processing component 802 may include one or more modules to facilitate the interaction between the processing component 802 and other components. For example, the processing component 802 may include a multimedia module to facilitate interaction between the multimedia component 808 and the processing component 802.

The memory 804 is configured to store various types of data to support operations at the communication apparatus 800. The memory 804 may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 806 supplies power to various components of the communication apparatus 800. The power component 806 may include a power management system, one or more power sources, and other components associated with power generation, management, and distribution of the communication apparatus 800.

The I/O interface 812 provides an interface between the processing component 802 and a peripheral interface module. The peripheral interface module may be a keyboard, a click wheel, buttons, etc. These buttons may include, but are not limited to a home button, a volume button, a start button, and a lock button.

The communication component 816 is configured to facilitate wireless communication between the access network device and other devices. In the embodiments of the present disclosure, the communication component 816 may provide a wireless network based on communication standards, such as 2G, 3G, 4G, 5G, or a combination of them, so as to connect to a terminal device.

In an example, the communication apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to perform the above communication method.

In an example, a non-transitory computer-readable storage medium including instructions is further provided, such as a memory 804 including instructions executable by the processor 820 of the communication apparatus 800 to perform the above communication method. For example, the non-transitory computer-readable storage medium may be an ROM, a random access memory (RAM), a CD-ROM, a magnetic tape, a floppy disk, an optical data storage device, etc.

Figure 10:
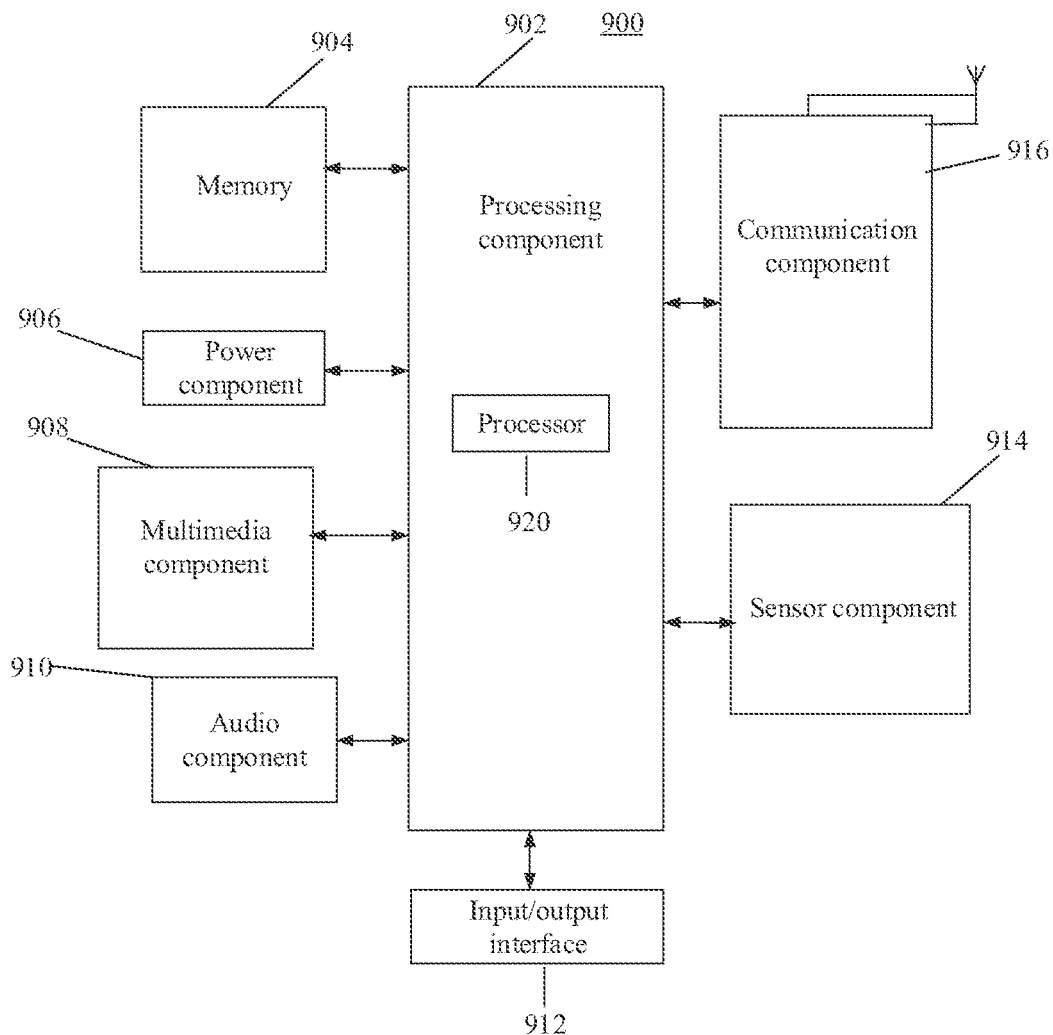
FIG. 10 is a block diagram of a communication apparatus according to an example.

FIG. 10 is a block diagram of a communication apparatus 900 according to an example, and the apparatus 900 may be the foregoing access point device. Referring to FIG. 10, the communication apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 usually controls the overall operations of a communication apparatus 900, such as operations associated with display, telephone call, data communication, camera operation and recording operation. The processing component 902 may include one or more processors 920 to execute instructions to complete all of or part of the steps of the above method. In addition, the processing component 902 may include one or more modules to facilitate the interaction between the processing component 902 and other components. For example, the processing component 902 may include a multimedia module to facilitate interaction between the multimedia component 908 and the processing component 902.

The memory 904 is configured to store various types of data to support operations at the communication apparatus 900. Examples of these data include instructions for any application or method operated on the communication apparatus 900, contact data, phone book data, messages, pictures, videos, etc. The memory 904 may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 906 supplies power to various components of the communication apparatus 900. The power component 906 may include a power management system, one or more power sources, and other components associated with power generation, management and distribution of the communication apparatus 900.

The multimedia component 908 includes a screen for providing an output interface between the communication apparatus 900 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some examples, the multimedia component 908 includes a front camera and/or a rear camera. When the communication apparatus 900 is in an operation mode, such as a shooting mode or a video mode, the front camera and/or the rear camera can receive external multimedia data. Each front or rear camera may be a fixed optical lens system or have a focal length and optical zoom capability.

The audio component 910 is configured to output and/or input an audio signal. For example, the audio component 910 includes a microphone (MIC), and when the communication apparatus 900 is in an operation mode, such as a call mode, a recording mode, and a voice recognition mode, the microphone is configured to receive an external audio signal. The received audio signal may be further stored in the memory 904 or sent by the communication component 916. In some embodiments, the audio component 910 further includes a speaker for outputting an audio signal.

The I/O interface 912 provides an interface between the processing component 902 and a peripheral interface module. The peripheral interface module may be a keyboard, a click wheel, buttons, etc. These buttons may include, but are not limited to a home button, a volume button, a start button, and a lock button.

The sensor component 914 includes one or more sensors for providing various aspects of status assessment for the communication apparatus 900. For example, the sensor component 914 may detect an on/off state of the communication apparatus 900, and relative positions of components such as a display and a keypad of the communication apparatus 900. The sensor component 914 may also detect a position change of the communication apparatus 900 or one component of the communication apparatus 900, presence or absence of contact between the user and the communication apparatus 900, an orientation or acceleration/deceleration of the communication apparatus 900, and a temperature change of the communication apparatus 900. The sensor component 914 may include a proximity sensor configured to detect the presence of nearby objects without any physical contact. The sensor component 914 may further include an optical sensor, such as a CMOS or CCD image sensor, used in imaging applications. In some embodiments, the sensor component 914 may further include an acceleration sensor, a gyroscope sensor, a magnetic sensor, a pressure sensor, or a temperature sensor.

The communication component 916 is configured to facilitate wireless communication between the communication apparatus 900 and other devices. In the embodiments of the present disclosure, the communication component 916 may access a wireless network based on communication standards, such as 2G, 3G, 4G, 5G, or a combination of them, so as to implement random access. In an example, the communication component 916 receives broadcast signals or broadcast associated information from an external broadcast management system via a broadcast channel. Optionally, the communication component 916 further includes a NFC module set.

In an example, the communication apparatus 900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above communication method.

In an example, a non-transitory computer-readable storage medium including instructions is further provided, such as a memory 904 including instructions executable by the processor 920 of the communication apparatus 900 to perform the above communication method. For example, the non-transitory computer-readable storage medium may be an ROM, a random access memory (RAM), a CD-ROM, a magnetic tape, a floppy disk, an optical data storage device, etc.

An example of the present disclosure further provides a communication system including an access network device and an access point device. The access network device is a communication apparatus provided by the embodiment shown in FIG. 9. The access point device is a communication apparatus provided by the embodiment shown in FIG. 10.

An example of the present disclosure further provides a communication system including a plurality of access point devices, and the plurality of access point devices are communication apparatuses provided by the embodiment shown in FIG. 9.

A person skilled in the art would readily conceive of other examples of the present disclosure after considering the specification and practicing the invention disclosed here. The present application is intended to cover any variations, uses or adaptive changes of the present disclosure. These variations, uses or adaptive changes follow the general principle of the present disclosure and include common general knowledge or conventional technical means in the technical field that are not disclosed in the present disclosure. The specification and the examples are merely regarded as example, and the real scope and spirit of the present disclosure are indicated by the following claims.

It should be understood that the present disclosure is not limited to the precise structure described above and shown in the drawings, and various modifications and changes can be made without departing from its scope. The scope of the present disclosure is only limited by the appended claims.

The invention claimed is:

1. A communication method, performed by a first access point device, comprising:
    obtaining first frequency usage record information, wherein the first frequency usage record information is used to indicate frequency occupancy in an available frequency band, and the available frequency band and a terahertz frequency band at least partially overlap; and
    determining an operating frequency of the first access point device according to the first frequency usage record information;
    wherein obtaining the first frequency usage record information comprises:
        receiving the first frequency usage record information on a set broadcast frequency.

2. The communication method according to claim 1, wherein the frequency occupancy at least indicates an occupied frequency in the available frequency band, and the operating frequency of the first access point device belongs to a frequency that is not comprised in the first frequency usage record information in the available frequency band.

3. The communication method according to claim 2, wherein the frequency occupancy further indicates an unoccupied frequency in the available frequency band.

4. The communication method according to claim 2, wherein determining the operating frequency of the first access point device according to the first frequency usage record information comprises:
    determining a first frequency according to the first frequency usage record information, wherein the first frequency belongs to a frequency that is not comprised in the first frequency usage record information in the available frequency band;

sending a frequency occupation request, wherein the frequency occupation request comprises indication information of the first frequency;
obtaining second frequency usage record information, wherein the second frequency usage record information is generated according to the frequency occupation request; and
in response to determining that the second frequency usage record information comprises a usage record indicating that the first access point device occupies the first frequency, determining the first frequency as the operating frequency of the first access point device.

5. The communication method according to claim 4, wherein the communication method further comprises:
sending the second frequency usage record information, wherein the second frequency usage record information comprises a usage record associated with the operating frequency of the first access point device, and the first frequency usage record information.

6. The communication method according to claim 5, wherein the usage record indicating that the first access point device occupies the first frequency comprises an identifier of the first access point device and the indication information of the first frequency.

7. The communication method according to claim 1, wherein the communication method further comprises:
sending a first signal on the operating frequency of the first access point device, wherein the first signal is used to establish a communication connection with a terminal.

8. The communication method according to claim 1, wherein the communication method further comprises at least one of the following:
receiving a first frequency release notification from an access network device, wherein the first frequency release notification is used to indicate the first access point device to release the operating frequency of the first access point device; or
sending a second frequency release notification, wherein the second frequency release notification is used to notify that the first access point device will release the operating frequency of the first access point device; or
receiving a third frequency release notification, wherein the third frequency release notification is used to notify that an operating frequency of a second access point device will be released.

9. The communication method according to claim 1, wherein the first frequency usage record information comprises at least one frequency usage record, and each frequency usage record comprises an identifier of an access point device and indication information of a used frequency.

10. A communication method, performed by an access network device, comprising:
obtaining first frequency usage record information, wherein the first frequency usage record information is used to indicate frequency occupancy in an available frequency band, and the available frequency band and a terahertz frequency band at least partially overlap; and
sending the first frequency usage record information;
wherein sending the first frequency usage record information comprises:
periodically broadcasting the first frequency usage record information on a set broadcast frequency.

11. The communication method according to claim 10, wherein obtaining the first frequency usage record information comprises:

obtaining frequency allocation record information of at least two access network devices, wherein the frequency allocation record information is used to indicate frequencies allocated by the at least two access network devices; and
obtaining the first frequency usage record information according to the frequency allocation record information.

12. The communication method according to claim 10, wherein the communication method further comprises:
receiving a frequency occupation request from a first access point device, wherein the frequency occupation request comprises indication information of a first frequency, and the first frequency belongs to a frequency that is not comprised in the first frequency usage record information in the available frequency band;
generating second frequency usage record information based on the frequency occupation request;
sending the second frequency usage record information.

13. The communication method according to claim 12, wherein generating the second frequency usage record information based on the frequency occupation request comprises:
in response to determining that the first frequency for the frequency occupation request from the first access point device and a first frequency for a frequency occupation request from another access point device at least partially overlap, adding a usage record associated with a frequency corresponding to an earlier frequency occupation request indicated by a timestamp to the first frequency usage record information, to obtain the second frequency usage record information.

14. The communication method according to claim 10, wherein the communication method further comprises at least one of the following:
sending a first frequency release notification to an access point device, wherein the first frequency release notification is used to indicate the access point device to release an operating frequency; or
receiving a second frequency release notification from the access point device, wherein the second frequency release notification is used to notify an access network device that the access point device will release the operating frequency.

15. The communication method according to claim 10, wherein the frequency occupancy at least indicates an occupied frequency in the available frequency band.

16. The communication method according to claim 15, wherein the first frequency usage record information comprises at least one frequency usage record, and each frequency usage record comprises an identifier of an access point device and indication information of a used frequency.

17. A communication apparatus, comprising:
one or more processors; and
a memory for storing processor-executable instructions;
wherein the one or more processors are collectively configured to load and execute the processor-executable instructions to implement the communication method according to claim 10.

18. A communication apparatus, comprising:
one or more processors; and
a memory for storing processor-executable instructions;
wherein the one or more processors are collectively configured to load and execute the processor-executable instructions to:

obtain first frequency usage record information, wherein the first frequency usage record information is used to indicate frequency occupancy in an available frequency band, and the available frequency band and a terahertz frequency band at least partially overlap; and determine an operating frequency of a first access point device according to the first frequency usage record information;

wherein the one or more processors are further collectively configured to load and execute the processor-executable instructions to:

receive the first frequency usage record information on a set broadcast frequency.

* * * * *